(12) United States Patent  (10) Patent No.: US 7,587,108 B2
Carpenter et al. (45) Date of Patent: Sep. 8, 2009

(54) OPTICAL DEVICE WITH CANTILEVERED FIBER ARRAY AND PLANAR LIGHTWAVE CIRCUIT

(75) Inventors: Barry S. Carpenter, Oakdale, MN (US); Terry L. Smith, Roseville, MN (US); Stephen J. Znameroski, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/424,755

(22) Filed: Jun. 16, 2006

(65) Prior Publication Data

US 2006/0291782 A1    Dec. 28, 2006

Related U.S. Application Data

(60) Provisional application No. 60/693,820, filed on Jun. 24, 2005, provisional application No. 60/693,847, filed on Jun. 24, 2005, provisional application No. 60/693,851, filed on Jun. 24, 2005.

(51) Int. Cl.
*G02B 6/30* (2006.01)
*G02B 6/00* (2006.01)

(52) U.S. Cl. .......................... 385/49; 385/137
(58) Field of Classification Search ........................ None
See application file for complete search history.

(56) References Cited

U.S. PATENT DOCUMENTS

| | | | |
|---|---|---|---|
| 5,343,544 | A | 8/1994 | Boyd et al. |
| 5,357,593 | A | 10/1994 | Bossler |
| 5,764,833 | A | 6/1998 | Kakii et al. |
| 6,526,204 | B1 | 2/2003 | Sherrer et al. |
| 6,795,634 | B2 | 9/2004 | Jeong et al. |
| 6,859,588 | B2 | 2/2005 | Kim et al. |

(Continued)

FOREIGN PATENT DOCUMENTS

CN    1515918    7/2004

(Continued)

OTHER PUBLICATIONS

Understanding Fiber Optics, 4th Edition, Jeff Hecht, p. 763 Glossary.*

(Continued)

*Primary Examiner*—Tina M Wong
(74) *Attorney, Agent, or Firm*—Robert A. Moshrefzadeh

(57) ABSTRACT

An optical device comprises a cantilevered fiber array coupled to a planar lightwave circuit. The cantilevered fiber array comprises a base supporting at least a portion of at least one optical fiber in a fiber guiding channel and a cover bonded to the base and/or the at least one optical fiber, where a terminal end of the at least one optical fiber extends beyond an end of at least one of the base and cover. The planar lightwave circuit comprises a planar waveguide formed on a substrate, the planar waveguide including a waveguide core. The terminal end of the fiber of the cantilevered fiber array is disposed in an alignment groove formed in a portion of the planar lightwave circuit substrate. A transverse channel is formed in the planar lightwave circuit substrate at an optical interface of the waveguide core and the terminal end of the at least one optical fiber.

14 Claims, 10 Drawing Sheets

U.S. PATENT DOCUMENTS

| | | |
|---|---|---|
| 6,882,790 B2 * | 4/2005 | Niiyama et al. ............. 385/137 |
| 7,116,886 B2 | 10/2006 | Colgan et al. |
| 7,296,934 B2 * | 11/2007 | Ono ............................ 385/55 |
| 2002/0028057 A1 | 3/2002 | Dautartas et al. |
| 2002/0076189 A1 * | 6/2002 | McMullin et al. ........... 385/137 |
| 2003/0081926 A1 | 5/2003 | Jeong et al. |
| 2003/0133688 A1 | 7/2003 | Wing Leung et al. |
| 2003/0142922 A1 | 7/2003 | Dallas et al. |
| 2003/0156814 A1 | 8/2003 | Yoon et al. |
| 2004/0022491 A1 * | 2/2004 | Tella et al. .................... 385/39 |
| 2005/0284181 A1 | 12/2005 | Smith et al. |

FOREIGN PATENT DOCUMENTS

| | | |
|---|---|---|
| EP | 1 486 806 A1 | 12/2004 |

OTHER PUBLICATIONS

Understanding Fiber Optics. 4$^{th}$ Edition, Jeff Hecht, p. 763 Glossary, 2002.

U.S. Appl. No. 11/277,770, filed Mar. 29, 2006, entitled "Method of Coupling Light into Microresonators".

U.S. Appl. No. 11/423,191, filed Jun. 9, 2006, entitled "Bonding Method with Flowable Adhesive Composition".

* cited by examiner

OPTICAL DEVICE WITH CANTILEVERED FIBER ARRAY AND PLANAR LIGHTWAVE CIRCUIT

CROSS REFERENCE TO RELATED APPLICATIONS

This application claims the benefit of U.S. Provisional Patent Application Nos. 60/693,820; 60/693,847; and 60/693,851, each filed Jun. 24, 2005. Each of these applications are incorporated by reference herein in their entirety.

FIELD OF THE INVENTION

The present invention generally relates to a cantilevered fiber array (CFA). The CFA can be used with integrated planar waveguide devices. The present invention also relates to an optical device that comprises a cantilevered fiber array coupled (either permanently or removably) to a planar lightwave circuit (PLC).

BACKGROUND OF THE INVENTION

The optical component industry is currently developing integrated planar waveguide devices, incorporating one or more optical functions onto a single component. An issue is the method of optically connecting to/from the integrated device. The current industry standard is to actively align and then adhesively bond a butt-joint connection between an optical fiber array and the optical component. This method generally requires the use of expensive equipment and can be relatively time consuming.

Self-aligned direct fiber attachment can also be used in an effort to reduce assembly cost while maintaining optical transmission quality. Manufacturers are attempting to place fiber alignment features directly on the PLCs. Conventional approaches for fiber attachment include "single fiber at a time" and mass fiber attachment.

Due to the small size and tight spacing, the "single fiber at a time" method requires delicate fixturing to individually position and then hold all the fibers in place during bonding. Additionally, handling individual fibers would be time consuming. Therefore, multiple fibers are typically mounted on a single "block", and the fiber-block assembly is handled and attached to the PLC as a unit.

For example, U.S. Pat. Nos. 6,859,588; 6,795,634; and US2003/0142922 describe conventional fiber optic block structures and methods of manufacture.

SUMMARY OF THE INVENTION

In an embodiment of the present invention, an optical device comprises a cantilevered fiber array (CFA) coupled to a planar lightwave circuit (PLC). The cantilevered fiber array comprises a base supporting at least a portion of at least one optical fiber in a fiber guiding channel and a cover bonded to the base and/or the at least one optical fiber, where a terminal end of the at least one optical fiber extends beyond an end of at least one of the base and cover. The planar lightwave circuit comprises a planar waveguide formed on a substrate, the planar waveguide including a waveguide core. The terminal end of the fiber of the cantilevered fiber array is disposed in an alignment groove formed in a portion of the planar lightwave circuit substrate. A transverse channel is formed in the planar lightwave circuit substrate at an optical interface of the waveguide core and the terminal end of the at least one optical fiber. In one aspect, the cantilevered fiber array comprises a plurality of fibers disposed in a plurality of fiber guiding channels, which may be spaced apart substantially in parallel. In this aspect, the planar lightwave circuit comprises a waveguide having a plurality of waveguide cores and a plurality of grooves formed in the planar lightwave circuit substrate.

In another aspect, the at least one optical fiber comprises a fiber ribbon cable. In another aspect, a stripped portion of the at least one optical fiber is disposed in the fiber guiding channel.

In another aspect, the cantilevered fiber array comprises a structural adhesive to bond the at least one fiber to the fiber guiding channel and cover. In another aspect, the base end face is formed at an angle.

In another aspect, at least one transverse channel is formed in both the cover and the base.

In another aspect, a transverse channel is formed in the cover that is oriented substantially perpendicular to the alignment groove of the base.

In another aspect, a UV curable index matching adhesive is used to bond the cantilevered fibers to the planar lightwave circuit.

In another aspect, the cantilevered fiber array includes a base having at least one alignment groove, a stripped portion of an optical fiber positioned in the at least one alignment groove, where a terminal end of the fiber extends beyond an end face of the base; and a cover bonded to a top surface of the base substrate securing the optical fiber between the base substrate and the cover, wherein a cover end face extends beyond the end face of the base. In another aspect, the end face of the cover is proximate to the end face of the fiber.

In another embodiment, a method of coupling a fiber alignment device, such as a CFA, to an optical waveguide device, such as a PLC, comprises providing a fiber alignment device having an extended cover protecting a floating cantilevered terminal portion of at least one optical fiber. The method further includes aligning the bare terminal portion of the at least one optical fiber with an alignment feature in the surface of an optical waveguide device. The method further includes bonding the fiber alignment device to the optical waveguide device.

In one aspect, the optical waveguide device includes a planar waveguide formed on a substrate, the planar waveguide including a waveguide core. A transverse channel is formed in the substrate of the optical waveguide device between an end of the alignment feature and a first face of the waveguide core. The method of attaching a fiber alignment device to an optical waveguide device can further include disposing the at least one fiber in the alignment feature, where the terminal end of the at least one optical fiber is disposed proximate to the transverse channel formed in the substrate of the optical waveguide device.

In another aspect, a UV curable index matching adhesive is dispensed and cured to bond the cantilevered fibers to the optical waveguide device.

In another embodiment, the cantilevered fiber array is part of a removable connector assembly that is mated with a PLC fitted with a receptacle part, such that when the connector is mated with the receptacle, the fibers in the cantilevered fiber array are inserted in the receiving grooves integrated on the PLC such that optical coupling between the fibers and waveguides is achieved.

In another embodiment, the cantilevered fiber array is part of a readout system that is used to interrogate a PLC device configured as a sensor. In this case, the cantilevered fiber array is registered with the PLC receiving grooves and waveguides so that the readout system can couple optical signals in and out of the PLC sensor.

The above summary of the present invention is not intended to describe each illustrated embodiment or every implementation of the present invention. The figures and the detailed description that follows more particularly exemplify these embodiments.

Figure 1:
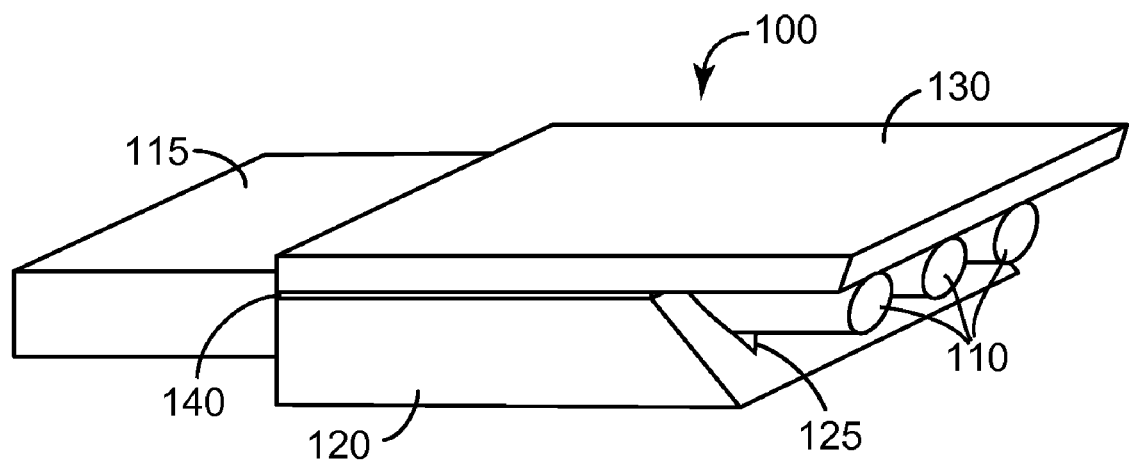
FIG. 1 is an isometric view of an exemplary cantilevered fiber array.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives thereof

DESCRIPTION OF THE PREFERRED EMBODIMENTS

In the following Description, reference is made to the accompanying drawings which form a part hereof, and in which are shown by way of illustration specific embodiments in which the invention may be practiced. In this regard, directional terminology, such as "top," "bottom," "front," "back," "leading," "trailing," etc., is used with reference to the orientation of the figure(s) being described. Because components of the embodiments of the present invention can be positioned in a number of different orientations, the directional terminology is used for purposes of illustration and is not limiting. It is to be understood that other embodiments may be utilized and structural or logical changes may be made without departing from the scope of the present invention.

An embodiment of the present invention generally relates to a device referred to as a cantilevered fiber array (CFA). The CFA can be used to couple with planar waveguide devices, such as a planar lightwave circuit (PLC). The description also provides a method to produce, assemble and polish CFAs, which can provide a mechanism to passively perform mass termination directly to optical components. The description also provides mechanisms to facilitate automated assembly and machine handling of (many) fiber wide arrays. The description also provides a method to passively couple one or more CFAs to a PLC.

As shown in isometric view in FIG. 1, an exemplary CFA 100 includes one or more fibers 110, such as from an optical fiber cable, such as a fiber ribbon cable 115. Stripped portions of the fibers are mounted on a base or substrate 120 (also referred to herein as a base substrate). The substrate 120 includes a plurality of fiber guides or channels 125, such as v-grooves, in which stripped portions of the fibers 110 are disposed and guided. A cover 130 can be optionally disposed on the substrate/guided fibers to prevent fiber displacement within the channels or grooves and to provide additional support. In addition, an adhesive (see FIGS. 2A-2F), such as a structural adhesive (e.g., a thermally accelerated or thermally curable structural adhesive, (e.g., a two-part epoxy, or the like)), can be provided to bond the fibers to the substrate 120 and guides 125, and to bond the cover 130 to the substrate 120. As shown in FIG. 1, a relatively thin adhesive layer 140 can be formed between cover 130 and substrate 120. Methods of forming the CFA and of coupling the CFA to a PLC are described in further detail below.

The base or substrate 120 provides support for the stripped and non-stripped portions of the fibers being aligned. An exemplary base or substrate 120 material is Silicon (Si), with a crystal orientation of [100], which provides for v-grooves to be accurately formed using the conventional Si photolithography infrastructure. Other materials (e.g. quartz, fused silica, borosilicate glass, etc.) can also be utilized. For example, fused silica provides essentially the same chemical, mechanical and thermal characteristics as the fibers being aligned. In the exemplary embodiments, conventional silica-based telecommunications fibers, such as 125 µm outer diameter (OD) SMF-28 Photonic optical fibers, commercially available from Corning Inc. (Corning, N.Y.), are utilized. As would be apparent to one of ordinary skill in the art, many different types of conventional optical fibers of differing ODs can be utilized in accordance with the embodiments described herein.

An exemplary cover 130 material is silica-based, such as fused silica or quartz, which nearly matches the chemical, mechanical and thermal characteristics of the guided fibers. Also, the chemicals used to clean the fibers can also be employed on the cover without leaving any type of residue on the fiber. A fused silica cover can be cut using the same equipment used with Si wafers. During the grinding/polishing operations, as explained in more detail below, a fused silica cover material is removed cleanly without coating the fibers. In addition, a fused silica cover can be transparent to ultraviolet (UV) light, which allows the use of an exemplary UV initiated, thermally cured index matching optical adhesive when bonding the CFA to a waveguide device, such as a PLC. For example, an adhesive such as Optodyne™ UV-2100 or UV-3100, available from Daikin Industries, Ltd, of Osaka Japan, can be utilized. Suitable adhesives are also described in commonly-owned, co-pending U.S. patent application Ser. No. 11/423,191, incorporated by reference herein in its entirety. In alternative embodiments, a material such as a silicon or another silica-based material can be used to form cover 130.

In addition, the adhesive layer 140 can be formed using a structural adhesive, such as a thermally cured or a thermally accelerated epoxy. For example, an adhesive such as 3M DP-190 Scotch-Weld adhesive, available from 3M Company, St. Paul, Minn., can be utilized. Further, other types of adhesives can be employed, depending on the bonding and mechanical properties that are appropriate for the base and cover materials.

More detailed views of several exemplary embodiments are shown in side view in FIGS. 2A-2F. Although only one fiber is shown in each of these exemplary embodiments, each CFA embodiment may incorporate one or more fibers, depending on the desired application.

Figure 2A:
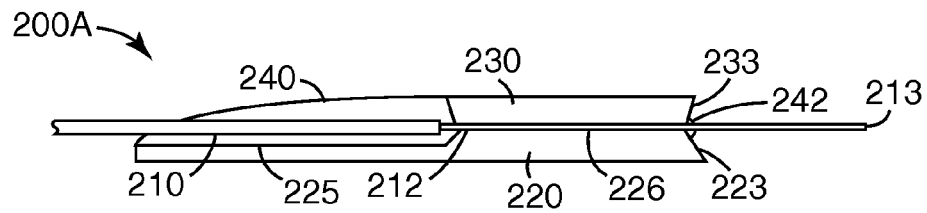
FIGS. 2A-2F show side views of alternative exemplary configurations of a cantilevered fiber array.

The CFA 200A of FIG. 2A includes a base or substrate 220, similar to base or substrate 120 described above. The base or substrate 220 includes a fiber support region 225 and a fiber guiding region 226, which includes fiber guiding channels, such as v-grooves. The number of v-grooves located in fiber guiding region 226 can be the same as or greater than the number of fibers being aligned. The fiber supporting region 225 supports the non-stripped portion of fibers 210, whereas stripped portions of the fibers can be disposed in the channels formed in fiber guiding region 226. The "stripped" portions 212 of fibers 210 refers to the core/clad light-guiding portions of the fibers, which may have one or more protective buffer coatings removed to expose the glass core/clad of the fiber. The fiber is "cantilevered" in that its terminal end extends beyond one or both end faces 223, 233.

An adhesive 240, such as a thermally curable adhesive, can be disposed on the base or substrate 220 to bond the fibers to the support. The adhesive is also used to bond the optional cover 230 to the base or substrate 220. Although cover 230 is shown as having a generally planar/flat structure, in an alternative aspect, cover 230 can be configured to include a support region, similar to region 225 of base or substrate 220. Based on the structure of the in-process device (described below) that is used to form CFA 200A, an adhesive fillet 242 is also formed at the end face of either the base-substrate or the cover, or both. The adhesive fillet 242 can provide a strain-relief mechanism, i.e., a "slow" migration from the little/no support cantilevered region, to a fully supported region between the base and cover.

In addition, as shown in FIG. 2A, and as described in more detail below, the end face 223 of the base substrate and the end face 233 of the cover are non-parallel. Also, the fiber terminal end(s) 213, which can be flat-polished, wedge-polished, cone-polished, or angle-polished, extend(s) beyond the end faces 223, 233 in this configuration.

Figure 2B:
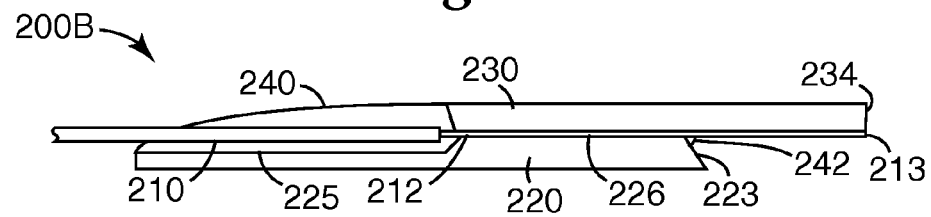

In the embodiment of FIG. 2A, the end faces 223, 233 are proximate to each other with respect to the extending fiber (i.e., the end faces 223, 233 are about the same distance from the terminal end 213 of the cantilevered fiber). In a different embodiment, as shown in FIG. 2B, CFA 200B includes a cover 230 whose end face 234 extends to the terminal end 213 of the fiber. In this embodiment, the cover extending to the terminal end of the fiber can minimize potential positional changes of the fiber caused by internal stress in the optical adhesive used to bond the CFA to a PLC. In this embodiment, cover end face 234 can be polished flat, angle-polished, conically polished, or wedge polished, while base end face 223 is angled.

Figure 2C:
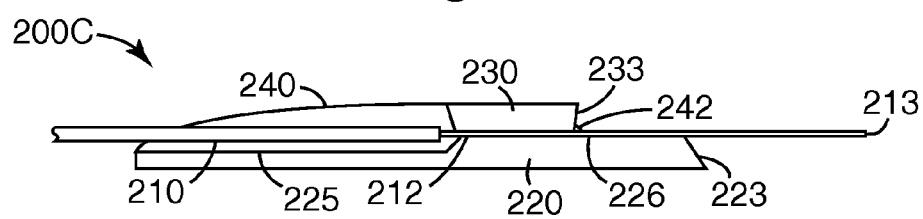
Figure 2D:
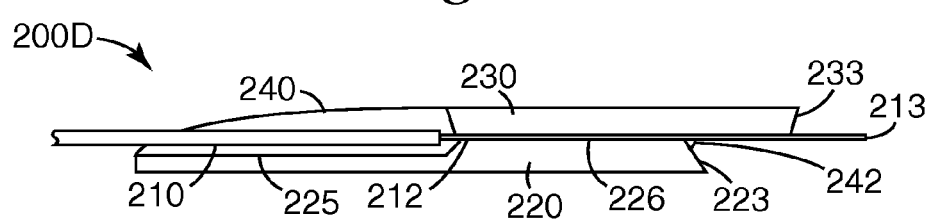

In a further embodiment, as shown in FIG. 2C, the cover 230 of CFA 200C is truncated, such that the end face 223 of the base substrate extends a greater distance along the fiber than does the end face 233 of the cover. In yet another embodiment, as shown in FIG. 2D, the end face 233 of the cover 230 of CFA 200D extends along the fiber at a greater distance than the end face 223 of the base substrate.

Figure 2E:
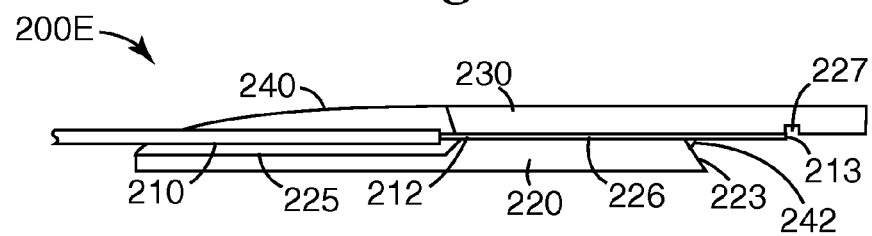
Figure 2F:
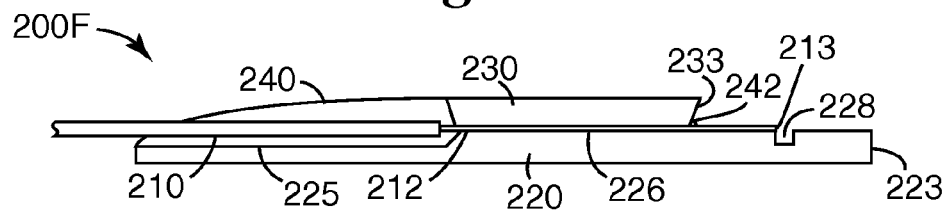

In a further embodiment, as shown in FIG. 2E, the cover 230 can extend beyond the terminal end 213 of the stripped fiber. In another embodiment, as shown in FIG. 2F, the CFA includes a base or substrate 220 that extends beyond the terminal end 213 of the stripped fiber.

In addition, in each of the embodiments of FIGS. 2A-2F, the base/cover end faces 223, 233 are non-parallel.

In an alternative embodiment (not shown), the cover 230 is absent, as a structural adhesive is used to bond the fibers in place in the groove region 226.

Figure 3A:
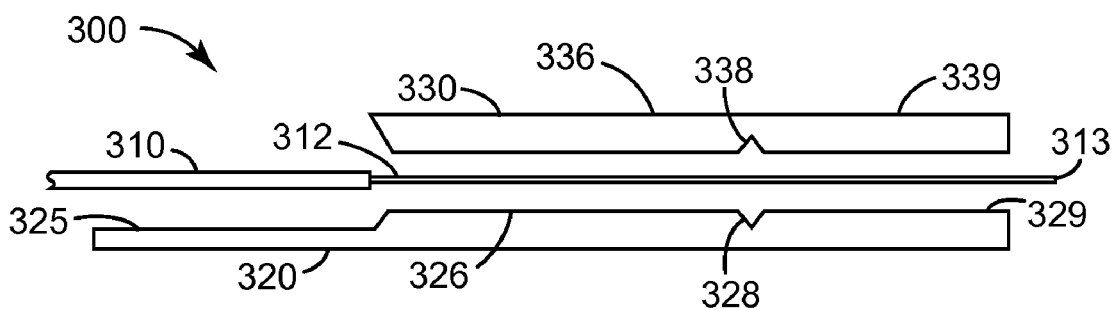
FIG. 3A shows a side view of an exemplary in-process fiber array structure.
Figure 4:
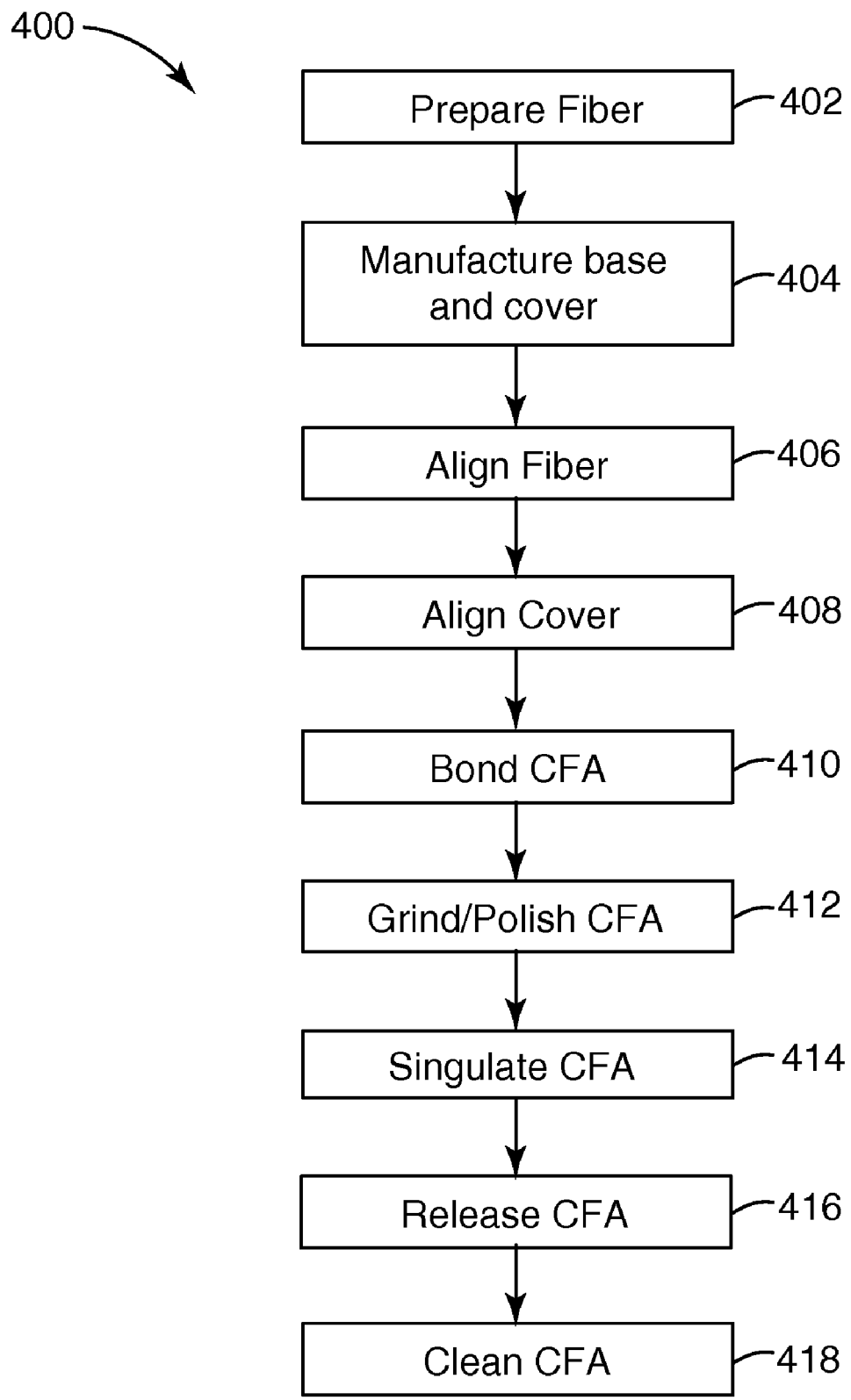
FIG. 4 is a flowchart showing an exemplary method of making a cantilevered fiber array.

According to another embodiment, CFA's 100, and 200A-200F can be manufactured in a straightforward method. For example, FIG. 3A shows an exemplary in process structure 300 that can be used to manufacture different configurations of CFAs. FIG. 4 shows a flow chart 400 of method steps that can be utilized in the manufacturing process.

In step 402, the fiber is prepared. Fiber preparation involves coiling, stripping, cleaning and/or cleaving individual optical fiber cables or cleaning, stripping, and/or cleaving individual fibers in a fiber ribbon cable. In this step, the cable can be cut to a length that is application specific—for example, the fiber can be cut to lengths from several millimeters to hundreds of meters in length. Coiling the fiber cable can protect the fiber from handling damage during manufacturing and makes fiber management much more straightforward. One free end of the coiled fiber cable is then stripped, cleaved and cleaned. Fiber stripping can be accomplished using conventional techniques, such as chemical and/or mechanical techniques. The cantilevered fibers can then be cleaved to a length equal to the length of the base substrate (minus the cable jacket strain-relief overlap). As part of the fiber preparation, prior to placing the fibers into the guiding or v-grooves of the substrate, the fibers can be cleaned using a diluted potassium hydroxide bath followed by series of deionized water rinses and drying.

In step 404, the base and cover substrates are manufactured. As mentioned above, the base substrate provides support for the stripped and non-stripped portions of the fibers being aligned. An exemplary base substrate material is Silicon (Si), with a crystal orientation of [100], which provides for channels, such as v-grooves, to be accurately formed using the conventional Si photolithography infrastructure. Other materials (e.g. quartz, fused silica, borosilicate glass, etc.) can also be utilized. For example, fused silica provides nearly the same chemical, mechanical and thermal characteristics as the fibers being aligned. Other substrate materials (e.g., quartz) can be fabricated by grinding, drawing or formed using other techniques.

Strips of multiple base portions or substrates can be used during assembly to decrease overall assembly time. Base substrate strips can include base substrate sections corresponding to multiple CFAs. Base substrate thicknesses can range from about 100 µm to about 500 µm, for example, with base widths being configured to be wide enough to support fibers from a particular fiber ribbon cable (e.g., 4 fibers wide, 8 fibers wide, 12 fibers wide, etc.) or from a plurality of fiber ribbon cables. The length of the base substrate is selected to be long enough to support both non-stripped portions of the fibers and stripped portions of the fibers.

Exemplary base substrates made out of silicon wafers can be fabricated using conventional photolithographic techniques to form the base substrate structure of the CFA. For example, as shown in the exploded side view of FIG. 3A, in process CFA structure 300, includes a base substrate 320, which is fabricated to include four main areas: strain-relief/fiber support region 325, fiber guide channel region 326, sacrificial portion or region 329, and a transverse channel portion 328, referred to herein as a "snap-gap."

The CFA base substrate strain-relief region 325 provides clearance for the thicker jacketed fibers 310 to allow the fibers to lay flat in the fiber guiding channels of region 326 without any abrupt bends in the fiber. Such clearance can be accomplished by forming a strain relief region as a recessed portion of the base. In addition, strain-relief region 325 provides a bonding area to adhere the optical fiber cable jacket to the base substrate. On a Si-based substrate, the strain-relief region 325 can be formed using a conventional etching technique, and also at the same time as the guiding channels, such as v-grooves, and the "snap-gap" are etched.

The CFA fiber guiding channel region 326 is the portion of the base substrate 320 that contains an appropriate number of channels or v-grooves that are formed on the correct center-to-center spacing to match a receiving PLC device channel spacing. The stripped optical fiber is guided and bonded into the base substrate channels in this region. For example, v-grooves spaced by an approximately 127 µm center-to-center spacing can be utilized to generate a CFA of compact width. Other center-to-center spacings can be utilized depending on the application and the type of PLC ultimately being coupled.

The shape and depth of the guiding channels can be formed through the use of conventional etching techniques, such as a KOH anisotropic etch through a pre-patterned $Si_3N_4$ layer of the exemplary silicon substrate.

In an exemplary embodiment, the depth of the v-groove channels can be formed based on the diameter of the stripped optical fiber and to set the gap or distance between the base 320 and the cover 330. The height of the base/cover gap (e.g., between about 10 µm and about 70 µm, and in some cases about 40-55 µm) is set to reduce the amount of adhesive utilized while increasing the base/cover adhesion for component strength. In a preferred aspect, the fiber guiding channels are formed at a depth that allows a portion of the fiber body to be positioned above the top surface of the fiber guiding region.

The CFA base substrate sacrificial portion or region 329 also includes guiding channels, as the sacrificial portion or region 329 is separated from the fiber guiding region 326 by one or more "snap-gap" channels that are formed transverse to the direction of the fiber guiding channels. In FIG. 3A, one snap gap 328 is shown in the in-process CFA structure 300, although more than one snap gap can be formed in the base. The sacrificial portion or region 329 supports the aligned fibers during the grinding/polishing procedures and protects the fibers until they are "released." Thus, the sacrificial portion or region 329 can reduce the likelihood that fibers may chip and/or break during the grinding/polishing process. In addition, sacrificial portion or region 329 can be used to increase the likelihood that the fiber end-faces are optically clear and all of the fibers are essentially the same length (within sub-micron tolerances) and with the same structure. The sacrificial portion or region 329 also provides lateral support preventing the fibers from moving sideways as well as forward and back during grinding and polishing and other component movement.

The CFA base substrate "snap-gap" 328 includes at least one channel or slot formed transversely to the fiber alignment channels. The "snap-gap" also separates the fiber guiding region and the sacrificial portion or region. The snap-gap channel or slot 328 can be formed via etching at the same time the fiber guiding channels are formed. Alternatively, the snap-gap channel or slot 328 can be formed by cutting into a top surface of the base substrate 320 using a cutting tool, such as a diamond dicing saw, when the base substrates are cut into strips containing multiple CFAs, as described further below.

The "snap-gap" 328 also can limit or stop the capillary flow of the bonding adhesive into the base substrate's sacrificial portion or region 329. Any adhesive between the cover and the sacrificial portion or region of the base substrate can bond the cover and base components together, making it very difficult, if not impossible, to release the fibers after singulation. Further, the "snap-gap" 328 can provide a mechanism to break-off the sacrificial portion or region to release the fibers, releasing the fibers to a cantilevered state and thus providing a straightforward way to seat the cantilevered fiber portions into the guiding grooves of a PLC during attachment, as described below. In an exemplary embodiment, the snap-gap 328 is etched or cut in a v-shape, thus providing a single stress point during the release step, and providing an angled end face for the fiber guiding region 326 of the base substrate 320 of the completed CFA. Snap gaps can also be formed as square shaped or other shaped channels.

Figure 3B:
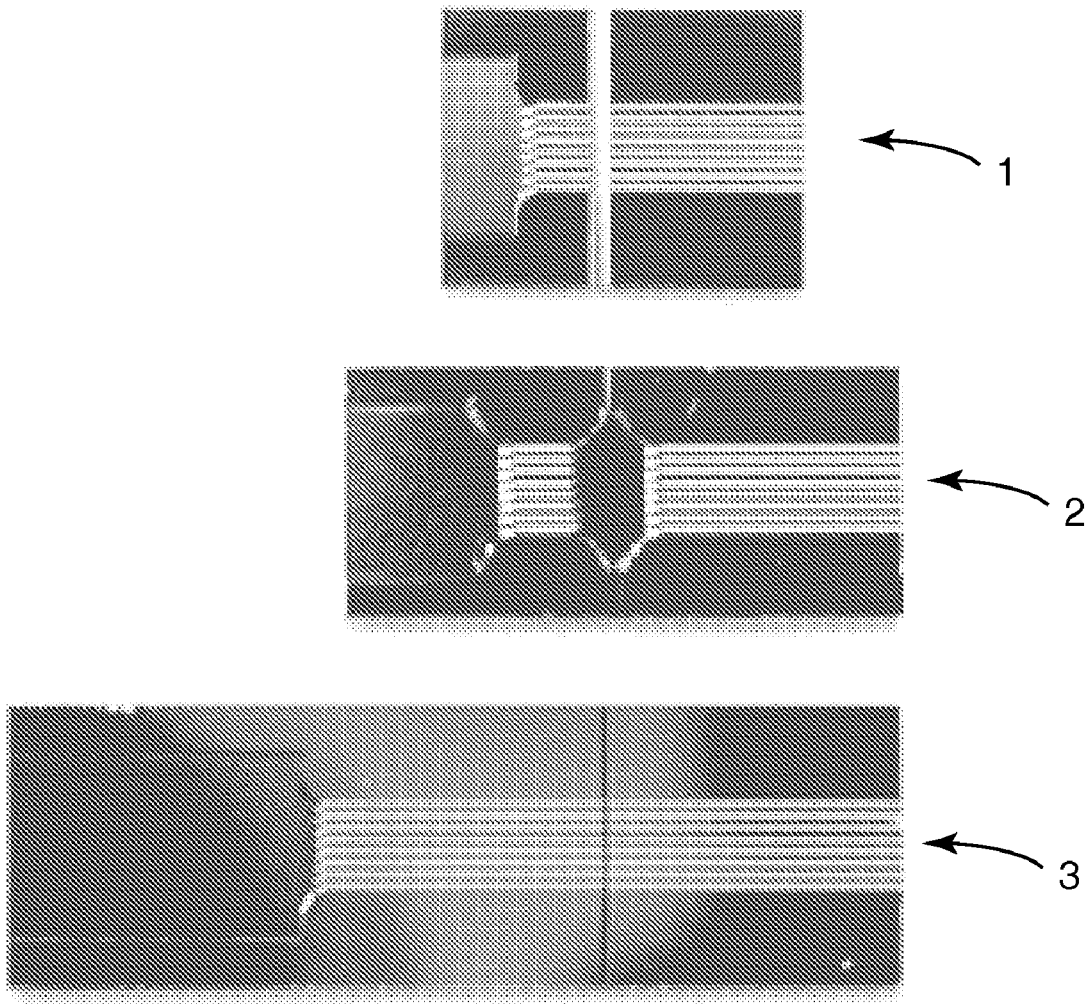
FIG. 3B shows three example base configurations for an in-process fiber array structure.

For example, FIG. 3B shows a top view of three different experimental Si CFA base substrates. These bases have been singulated to an appropriate width for one-at-a-time CFA assembly (in practical applications, finished CFAs can be diced closer to the fibers/v-grooves). All experimental CFA base substrates have eight v-grooves and have different overall lengths: 5 mm, 7.5 mm and 12 mm (top to bottom respectively). The center base has an etched snap-gap and the top and bottom bases (as shown in the figure) have snap-gaps cut using a dicing saw.

Also in step 404, the cover substrate(s) (if utilized in the finished CFA) can be manufactured. An exemplary cover 330 is shown in FIG. 3A. In an exemplary embodiment, the CFA cover 330 clamps the stripped optical fibers into the channels or v-grooves in the sacrificial portion or region of the base during the fiber grinding/polishing manufacturing operation described below. In addition, the cover can protect the optical fibers from excessive motion during the dicing process. The cover also can press the cantilevered fibers into the v-grooves during CFA assembly and CFA/PLC attachment. The cover can also provide some support to the optical fiber/PLC interface.

During the manufacturing process, for example, multiple cover substrates can be cut into strips of multiple arrays wide to match the base substrate width. Depending on the tooling used, the cover strip may be cut slightly longer than the base substrates strip, as a longer cover strip can be used to contact alignment equipment to properly set the cover position relative to the base substrate. Exemplary cover thicknesses can range from about 500 µm to about 1500 µm (or greater), depending on the rigidity required for a particular application, although other cover thicknesses can be utilized, as is practical. For example, a cover 330 with increased thickness can increase the strength of the CFA/PLC gap fiber support. In addition, an increased fused silica cover thickness can increase the strength of a component in the system with the same mechanical, thermal characteristics as the fiber(s). Further, the cover's stiffness increases with thickness, thus decreasing cover flexing during the bonding process.

Cover 330 can have a substantially planar or flat inner surface (i.e., the surface in contact with the base substrate) or the inner surface can include guiding channels that correspond to the guiding channels in the base substrate. In a further alternative aspect, cover 330 can be configured to include a fiber support region, similar to that described above. In an exemplary embodiment, cover 330 has a flat inner surface, as a flat cover is less expensive to produce. In addition, the cross-section of a flat cover substrate covering a fiber seated in a v-groove reduces the amount of void area surrounding the fiber, which reduces the amount of adhesive that can surround the fiber after bonding. Excessive adhesive surrounding the seated fiber can affect optical performance.

As with the base substrate, the cover 330 can include a snap-gap or channel 338. Similar to the base snap-gap(s), the CFA cover "snap-gap" 338 includes at least one channel or slot formed transversely to the fiber alignment channels of the base, and can separate a main cover region 336 from a cover sacrificial portion or region 339. The snap-gap channel or slot 338 can be formed via etching or by the use of a cutting tool, such as a diamond saw.

In addition, depending on the CFA configuration, the edges of the cover 330 can be chamfered to provide a low-stress lead-in for the fiber. The chamfering of the cover's edges can be cut into the cover during the formation of the cover snap-gap(s). Alternatively, the cover chamfer can be ground on the edge after the dicing step. Chamfering of the cover in the context of this application involves radiusing the edge of the cover to prevent direct contact of the bare fiber with a sharp edge of the cover. In an exemplary aspect, the back edge of the cover is chamfered in the vicinity of the strain relief region prior to the assembly of the CFA.

The "snap-gap" 338 also can limit or stop the capillary flow of the bonding adhesive onto the cover's sacrificial portion or region 339. As mentioned above, any adhesive between the cover and the sacrificial portion or region of the base substrate can bond the cover and base components together, making it very difficult to release the fibers after singulation. Further, the "snap-gap" 338 can provide a mechanism to break-off the sacrificial portion or region 339 to release the fibers, in some embodiments. In an exemplary embodiment, the snap-gap 338 is etched or cut in a v-shape, thus providing a single stress point during the release step. According to various embodiments, the cover snap-gap 338 can be located at the same location along the fibers as the base snap-gap 328, or at a different location along the length of the fibers.

The base substrate and cover can be cleaned prior to step 406 in order to remove debris. For example, the guiding or v-groove substrates can be cleaned and inspected to insure the removal of particles and any chemical contamination. Cleaning can be accomplished by using a series of dips in solutions, such as detergent/deionized water/acetone/HFE solutions, that are ultrasonically agitated. Visual inspection can be used to confirm the presence/absence of debris or other contaminants.

Referring back to FIG. 4, in step 406 fiber alignment is performed. In one exemplary embodiment, the fibers can be aligned by placing the stripped fiber end(s) into the fiber guiding channels of the base substrate. Once all of the fibers of an individual cable are properly positioned in the guiding channels, the fiber cable can be clamped into position. The fiber cables can be aligned and clamped one-by-one to fill all the fiber channel sets on the base substrate. Further alignment can be performed by setting the appropriate fiber cable jacket/base substrate strain-relief region overlap such that the end of the fiber cable jacket is roughly centered in the strain-relief region.

In step 408, a cover alignment to the fiber filled base substrate is performed. In one exemplary embodiment, the snap-gap 338 in the cover can be aligned to the snap-gap 328 in the base substrate. The base and cover can be held in place by, e.g., clamps, vacuum chucks, etc., then brought into contact with each other. In order to avoid potential misalignment of the fibers, the cover is held such that the inner surface of the cover is substantially parallel to the fiber guiding surface of the base. Once the cover is properly positioned, the bond head is lowered to clamp the base, fiber, cover assembly together.

In step 410 bonding is performed. In one exemplary embodiment, bonding is accomplished by dispensing a structural adhesive, such as a thermally curable adhesive, on the strain-relief region 325 of the base. Clamping the fibers between the base 320 and the cover 330 before the adhesive is applied can result in a 3-point line contact between each fiber and the base and the cover. Capillary action will cause the adhesive to flow along the fibers/v-grooves and between the cover and base substrate. The capillary force will diminish at the collective opening of the cover/base snap-gaps and the adhesive flow can stop. The adhesive curing profile is adhesive dependent. Exemplary adhesives include 3M DP-190 Scotch-Weld adhesive, available from 3M Company, St. Paul, Minn., where this adhesive is a thermally accelerated curing structural 2-part epoxy. As mentioned previously, other adhesives can be utilized.

In addition, in an exemplary embodiment, the fiber aligning grooves in the base substrate can be designed to minimize the amount of structural adhesive that collects in the immediate vicinity of the fiber, as at least some polymeric adhesives can affect the light propagation within the fiber when in use. Also, excessive adhesive shrinkage during curing coupled with a high modulus adhesive can result in some longitudinal compression of the optical fiber, which can cause micro-bend losses within the fiber. To that end, the center-to-center spacing and the shape/type of channels or v-grooves in the fiber guiding region can be a factor in the amount of structural adhesive near the fiber(s).

In step 412, grinding and/or polishing is performed on the terminal end of the in-process CFA 300. In this step, the fiber terminal ends can be polished in mass to provide flat-polished, wedge-polished, cone-polished, or angle-polished terminal ends.

In an exemplary embodiment, CFA 300 includes a cover 330 to protect the fibers during mass grinding/polishing. Allowing the fibers to flex back and forth during the grinding/polishing process could cause fiber breakage, chipping or other damage. Further, with the cover 330 in place, there is no need to temporarily bond the fibers into the channels or v-grooves.

For example, grinding and polishing can be performed using a conventional polishing device, such as a modified Ultra-Tec Ultrapol® lapping/polishing system. Exemplary grinding and polishing equipment maintains polishing quality and surface flatness, e.g., by using an oscillating swing arm mechanism to simplify fiber cable management. In experiments conducted by the investigators, an oscillating swing-arm was modified to include an adjustable floating head mechanism while still incorporating the angle adjustment features, to provide for vertical polishing height adjustment when changing platens or lapping films. The adjustable floating head can provide for the grinding/polish force to be easily adjusted while maintaining the angular adjustment setting.

In addition, the use of an oscillating swing arm mechanism can help maintain the CFA assembly's orientation to the rotating platen. Maintaining the CFA orientation to the rotating platen allows the fibers to be continuously forced into the v-grooves, which minimizes possible movement of the fibers.

In an exemplary embodiment, during the grinding/polishing operation, the cover and base substrates are substantially prevented from flexing, as flexing of the cover or base substrates could allow the fibers to move in the guiding channels.

Flexing of the cover and base substrates can also result in the creation of space for debris to build up between the fiber and cover and base substrates. This debris can change the angle that the fiber(s) will be polished, slightly deviating from the desired end-face angle. To help minimize fiber movement in the guiding channels during polishing, the CFA assembly can be rigidly clamped as close to the finished end length as practical. For example, a mechanism can be integrated into the clamp to fasten the clamp to the swing-arm assembly.

Exemplary grinding/polishing abrasive media can be utilized in step 412, such as 3M Diamond Lapping Films, available from 3M Company, St. Paul, Minn. Grinding is utilized to prepare the fibers to the proper length, while polishing is used to define the shape of the fiber terminal ends, and to remove pits formed in the grinding stage. In experiments, sample CFAs underwent grinding and polishing (for approximately 30 seconds per sheet) using progressively decreasing grit size abrasive sheets, from 30 micron grit size continuing down to 15, 9.0, 6.0, and then 3.0-micron abrasive (for grinding), and 1.0, 0.5 and 0.1-micron abrasive grit size for polishing. The times stated in this example can vary with the number of CFAs in a subassembly and the application specific size and width of the CFA components. As would be apparent to one of ordinary skill in the art given the present description, there are alternative grinding/polishing implementations that can be utilized.

The above grinding/polishing step can be performed in mass; where all of the fibers of a single CFA or a CFA strip are ground and polished at the same time, minimizing the fiber-to-fiber variation.

As described above, multiple CFAs can be configured, etched, assembled and ground/polished in batch form as a strip of one-to-many CFAs. In step 414, singulation can be performed, where a strip of CFAs is singulated or diced into single individual CFAs. The timing of this step is application specific. If multiple CFAs are attached to the same number of PLCs in batch form, singulation can be performed after the ends are attached.

For singlewide attachments, the CFA strip can be sliced to proper width using a wafer dicing saw or other suitable cutting tool.

In step 416, the fiber is released from the base and/or cover substrates to form a cantilevered fiber. In an exemplary embodiment, releasing is performed after singulation. In the releasing step 416, the sacrificial portion of the base and/or cover substrate is broken off exposing the cantilevered fiber. The releasing step can be performed by applying appropriate force (e.g., by hand or by tool) to the sacrificial portion of the base/cover substrate. The direction of the applied force is preferably transverse to the plane of the base/cover (e.g., a downward force can be applied to the base to release the base). The presence of the "snap-gap" allows the sacrificial portion to be broken off cleanly, as the "snap-gap forms a single stress point and prevents adhesive flow to the sacrificial regions of the cover/base substrates. Depending on the type of structure desired for a particular application (see e.g., the example structures shown in FIGS. 2A-2F), one or both of the base/cover sacrificial regions can be released.

Also, with respect to the embodiments shown in FIGS. 2E and 2F, an additional saw cut (227, 228) can be made to yield a fiber that is shorter than either the cover or base. Specifically, in the exemplary embodiment of FIG. 2E, the CFA is cut from the bottom side of the base such that the blade of the dicing saw cuts through the base and fiber and into the cover to form a slot 227. After the slot has been formed, the remaining base sacrificial portion(s) can be released. A similar process can be used to manufacture a CFA in accordance with FIG. 2F, except that the saw cut is made through the cover and into the base forming slot 228, followed by the release of the remaining cover sacrificial portion.

In step 418, a cleaning step can be utilized. For example, if the CFA is to be attached to a PLC, cleaning can be the last operation prior to attachment. The grinding/polishing and dicing operations can create a large amount of debris or contaminants that can inhibit the fibers from fully seating into the PLC device's receiving grooves and prevent proper light propagation. For example, cleaning can be performed using a hot acid bath (e.g., sulfuric acid) to remove any excess structural adhesive and a diluted potassium hydroxide bath to remove particulates.

In another embodiment, for mass production, whole silicon wafers can be laid-out with CFA substrates to maximize the number of arrays or possibly match the center-to-center spacing of the waveguide device substrates. In either case, the fiber arrays can be assembled, ground/polished and cleaned in mass, in a manner similar to that described above, to maximize manufacturing throughput.

Ultimately, the above process can be varied, as would be apparent to one of ordinary skill in the art given the present description. For example, the layout of the array base substrate can designed to match the layout of different PLC device configurations, including the number of channels or v-grooves and the center-to-center spacing of the channels or v-grooves. As mentioned above, the number of channels or v-grooves for each PLC can be from 1 to x, where x can be any number (limited only by the width of the wafer).

Figure 7A:
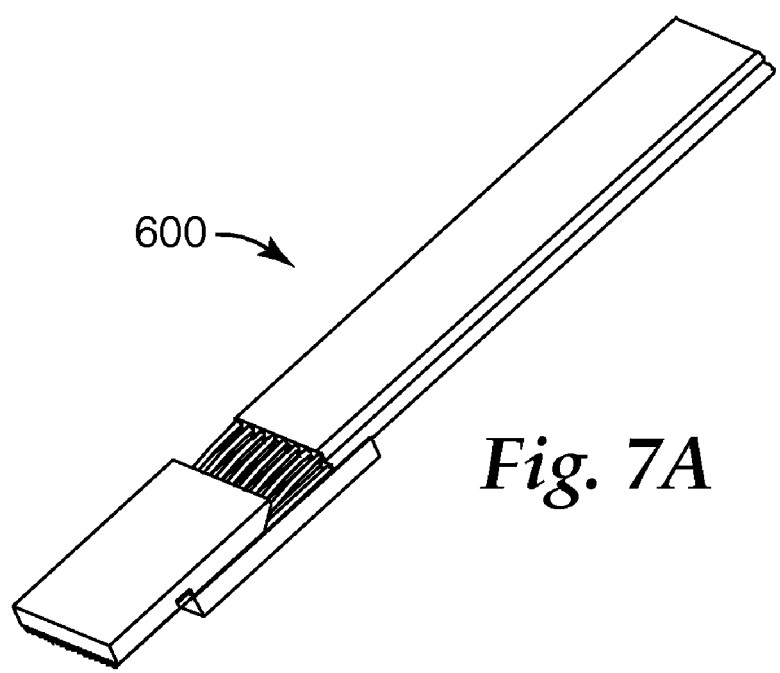
FIG. 7A shows an isometric view of an alternative CFA device.
Figure 7B:
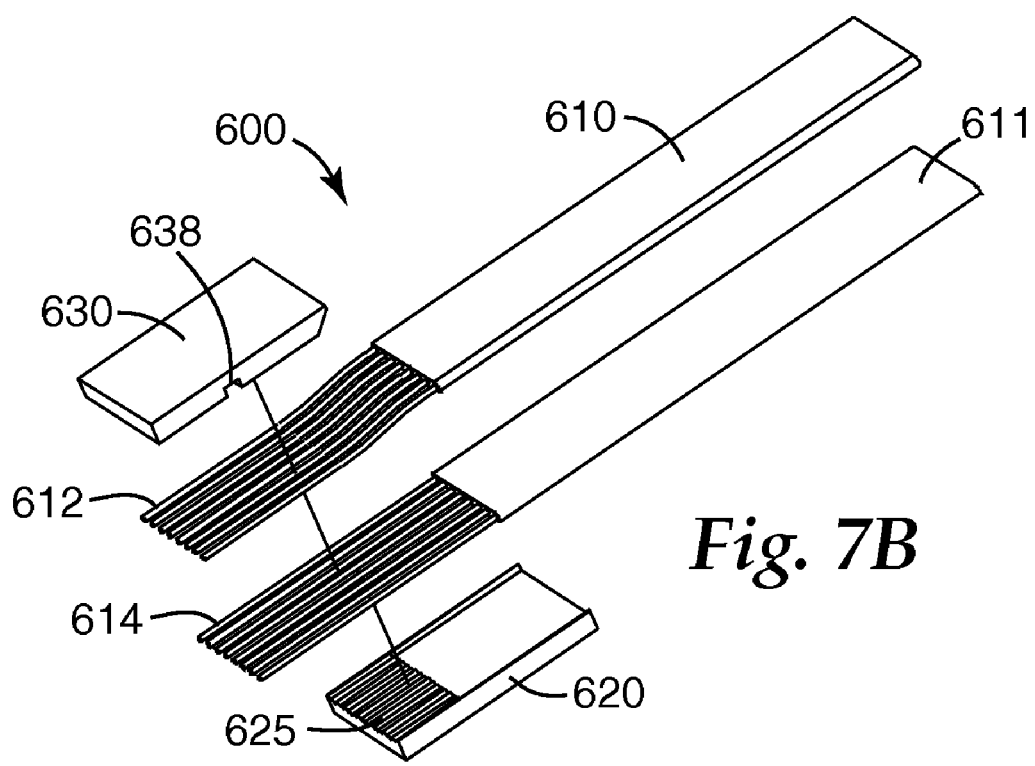
FIG. 7B shows an isometric exploded view of the alternative CFA device of FIG. 7A.

In an alternative embodiment, as is shown in FIGS. 7A-7B, a CFA 600 can be configured to combine the fibers of a plurality of fiber ribbon cables. In this exemplary embodiment, two separate fiber ribbon cables 610, 611 are utilized. For example, the fibers 612 and 614 of ribbons 610 and 611 can be prepared, as described above. The ribbons 610 and 611 can be arranged in a stacked arrangement (as shown), or in a side-by-side arrangement. The base substrate 620 can include a plurality of fiber guides or channels 625, such as v-grooves, in which stripped portions of the fibers 612, 614 are disposed and guided. In this exemplary embodiment, the fibers 612 and 614 are interleaved with one another and guided on fiber guides or channels 625. In addition, the cover 630 can include a channel or cut-out 638, which can stop the flow of adhesive when using an adhesive to bond the CFA to, e.g., a PLC.

As mentioned above, in one exemplary application, the CFAs described above can be coupled to a planar lightwave circuit (PLC). The circuit portion of the PLC is a planar waveguide circuit that can be configured in a variety of ways, including, but not limited to, a straight line circuit (1 to 1), a splitter circuit (1 to $2n$), an arrayed waveguide grating wavelength multiplexer, a thermo-optic switch, a microresonator sensor array, and a cross connect-type circuit. Different types of waveguide patterns can be utilized for the PLC, as would be apparent to one of ordinary skill in the art given the present description.

FIG. 5 shows such an exemplary CFA-PLC structure, optical device 500, shown in side view. The two main components of device 500 are CFA 501 and PLC 550. CFA 501 includes one or more fibers 510, such as from an optical fiber cable, such as a fiber ribbon cable. Stripped portions of the fibers 511 are mounted on a base 520. The base 520 includes a plurality of fiber guides or channels, such as v-grooves, in which stripped portions of the fibers 511 are disposed and guided. A cover 530 can be optionally disposed on the substrate/guided fibers to prevent fiber displacement within the channels or grooves and to provide additional support when coupling to PLC 550. In addition, a structural adhesive 540, such as a thermally accelerated curable structural adhesive, (e.g., a two-part epoxy) can be provided to bond the fibers to the base 520 and the channels or v-grooves, and to bond the cover 530 to the base 520.

The base end face 523 (and/or the cover end face in other embodiments) can be formed at an angle, as a result from the release of a sacrificial portion during the releasing step described above. In addition, the cover 530 can include a channel or cut-out 538, which can stop the flow of adhesive. The structure and fabrication of CFA 501 can take place in a manner similar to that described above for CFA 100 and CFAs 200A-200F, such that the CFA may take one of many alternative forms. For example, in an alternative structure, the CFA orientation can be flipped over (such that the base is above the fiber and cover), such that the end of the base substrate extends beyond the end of the cover. In this implementation, the guide channels of the base substrate can provide both vertical (up or down) and horizontal (side-to-side) support for the cantilevered fibers being coupled to the PLC.

Figure 5A:
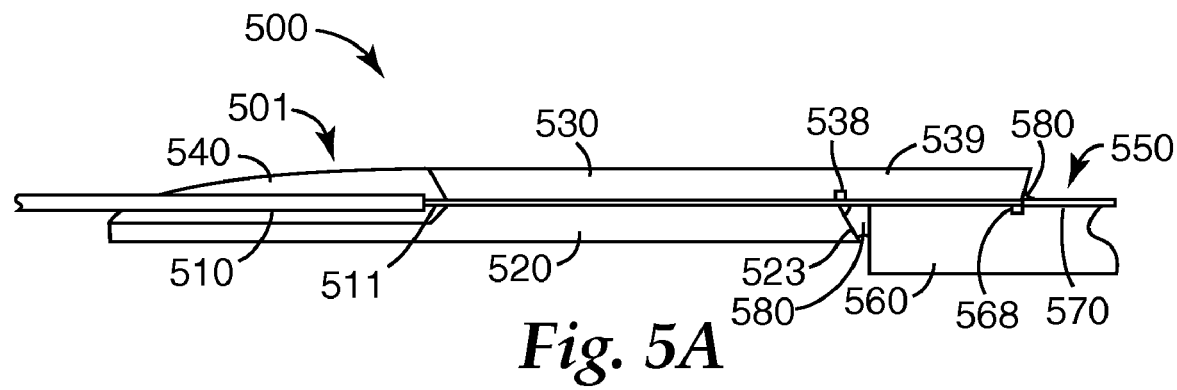
FIG. 5A shows a side view of an exemplary CFA-PLC device.

The PLC 550 (described in greater detail with respect to FIG. 6 below) can include a waveguide substrate 560 that supports waveguide cores 570 (waveguide cladding layer(s) are omitted from FIG. 5A for simplicity), which can be optically coupled to the output ends of the cantilevered fibers of the CFA. Waveguide substrate 560 further includes a plurality of alignment features, such as fiber guides or channels, such as v-grooves, to receive and align the cantilevered fibers from the CFA. Index matching adhesive 580, such as UV curable index matching adhesive, can be used to bond the CFA to the PLC, although other types of adhesives can also be utilized.

Figure 6:
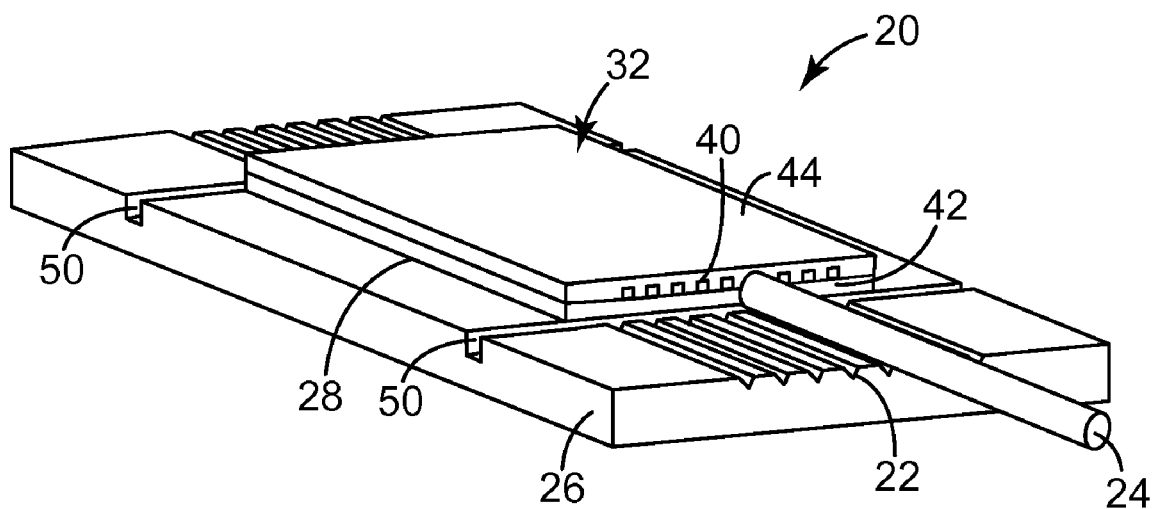
FIG. 6 is an isometric view of an exemplary PLC.

An example PLC, and an exemplary method of making a PLC, are described in further detail in pending and commonly-owned U.S. Patent Publication No. 2005/0284181 A1, incorporated by reference herein in its entirety. As shown in FIG. 6, an exemplary PLC can include a planar waveguide assembly 20 having integral alignment features 22 for positioning an optical fiber 24 (such as from a CFA). In this exemplary embodiment, the singulated waveguide assembly comprises a substrate 26 having alignment features 22 formed therein. An etch stop layer 28 covers the substrate 26. The etch stop layer 28 includes a patterned portion (hidden in FIG. 6) corresponding to a pattern of alignment features 22. A waveguide structure 32 is positioned on the etch stop layer 28, with only the patterned portion of the etch stop layer 28 uncovered or revealed by waveguide structure 32. The uncovered or revealed patterned portion of the etch stop layer 28 may optionally be removed after formation of alignment features 22. A portion of the etch stop layer 28 remains positioned between the substrate 26 and the waveguide structure 32, even if the patterned portion is removed.

In an exemplary embodiment, the waveguide assembly comprises a silicon substrate 26 having a plurality of V-shaped (or other shaped) alignment features 22 formed therein. A silicon nitride etch stop layer 28 covers the substrate 26 between substrate 26 and waveguide structure 32. Waveguide structure 32 includes a plurality of waveguide cores 40 (each corresponding to an alignment feature 22) sandwiched between a lower cladding layer 42 and an upper cladding layer 44.

In addition, PLC 20 further includes a transverse channel 50, such as formed by a saw cut or similar operation, formed at the junction of the waveguide cores 40 and alignment features 22 to remove any residual radius at the junction and provide a flat surface at the end of the waveguide cores 40 suitable for mating to an optical fiber or other optical device. The walls of the transverse channel 50 may be perpendicular to the wafer surface, or angled for reduction of optical reflections. The channel formation can be performed during component dicing operation. Strips of waveguide chips (not shown) are diced from the substrate 26, and the ends of the waveguide cores 40 may be given an additional optical polishing treatment. The strips of waveguide chips can be further diced to separate individual planar wave-guide assemblies 20. The singulated assemblies are then ready for cleaning and assembly with optical fibers from a CFA.

In one embodiment, the number of fiber receiving channels disposed in the PLC substrate matches both the number of waveguide cores disposed in the PLC and the number of fibers extending from the CFA. In an alternative embodiment, the PLC substrate can include a greater number of fiber receiving channels than the number of fibers extending from the CFA or waveguide cores disposed in the PLC. For example, due to possible symmetrical differences between the PLC channels and the CFA fiber channels, there may be minor differences in the Si etch rate during manufacturing (for embodiments where the PLC substrate and the CFA substrate are both Si-based). In the event that the etching processes are not matching, providing extra fiber receiving channels in the PLC substrate can compensate for different etch rates. To maintain symmetry, the extra fiber receiving channels can be exact copies with the same center-to-center spacing and can be placed outwardly of the active fiber receiving channels. Similarly, extra fiber guiding channels or v-grooves can be added to the CFA. In addition, dummy fibers can be used to fill non-operative outer fiber channels.

Figure 5B:
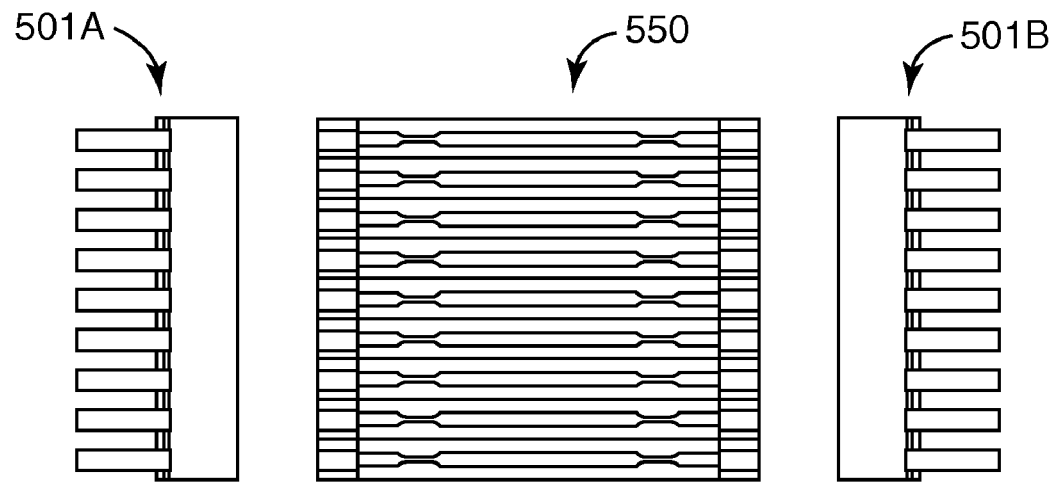
FIG. 5B shows a top view of CFAs and PLCs produced in mass form, including non-diced CFA strips and a non-diced PLC strip.

As shown in FIG. 5B, in top view, the CFAs and PLCs may be produced in mass form, such as using non-diced CFA strips 501A and/or 501B, and non-diced PLC strip 550. The strips can be diced (as described above) to form single CFA-PLC devices or CFA-PLC-CFA devices (where both ends of the PLC are coupled to CFAs).

The present description further provides a method for the accurate and rapid passive coupling of CFAs to PLCs. Passive alignment is advantageous in that there is a reduced need for active equipment to transmit light through the source fibers and to detect and measure the output light amplitude. An inherent problem with an active method is that only the light coupling of the active fiber channels is maximized, the other optical channels may have much lower output levels depending on the individual fiber/waveguide lateral offset and the warp/curvature of both the PLC wafer and the fiber array substrate creating an offset. In addition, an active coupling technique can require that an operator manually adjust the initial position of the fiber arrays until at least a small level of light coupling is achieved. In most cases, both the input and output fiber(s) must be positioned and aligned while attempting to achieve maximum light throughput which increases the complexity of the problem.

The use of a CFA, such as described above, decreases some of the mechanical tolerances of the actual optical components while providing passive optical alignment. The CFAs also decrease the precision and complexity of the alignment equipment, further decreasing the manufacturing costs. The cantilevered fibers of the CFAs described above are tolerant of the center-to-center spacing differences between the individual PLC light paths.

In this exemplary embodiment, the alignment features 22, such as v-grooves, of the PLC device can set the horizontal and vertical position of the cantilevered fibers. The CFAs are effectively immune to the (non) flatness issues of the PLC or the fiber array substrates because the cantilevered fibers have the ability to "float" vertically and horizontally to match the component's v-groove spacing, necessary for true passive alignment. This is also true with depth variations of the PLCs' alignment features; as the cantilevered fibers from the CFA can conform to the PLCs' v-groove profile.

According to an embodiment of the present invention, a CFA is designed to be manually or automatically attached to a PLC device. As would be apparent to one of ordinary skill in the art given the present description, while there are a number of different ways to orientate, align and bond the CFA to the PLC, this present example provides a one-at-a-time bonding method.

In this exemplary embodiment, a PLC is attached to a CFA using a constant force bonder, where one of the PLC/CFA is initially held stationary, while the other component is moved into place so that the cantilevered fibers of the CFA are received by the fiber receiving channels of the PLC. In one example, the bonder can include a stationary thermode with an integrated vacuum chuck to hold the PLC device in place. A bond head can be positioned above the thermode. The bond head can be mounted on a vertically mobile x/y planarization stage. The vertical stage can be motor driven with an air driven sub-stage controlling the bonding pressure. Prior to bonding, the bond head contact surface can be adjusted parallel to the thermode using the x/y planarization stage. The bond head can be constructed from quartz to allow the use of UV cured adhesives. The bond head can be designed to contact only the CFA cover above the fiber receiving channels of the PLC. To allow for infinitesimal height differences in v-groove heights, the bond head can be coated with a very thin compliant layer (such as Teflon tape). The bonder can also include one or more microscopes for visual inspection of the coupling.

During CFA/PLC attachment, an excessive cover width, in conjunction with the bonding compliant layer, can result in a bending of the outward edges of the cover downward. This bending moment can change the purely vertical motion of the bond head to one with a vertical plus a slight horizontal component. This horizontal force can cause lateral misalignment to occur. In an exemplary embodiment, a thicker, narrow CFA cover can reduce the likelihood of this potential problem.

The CFA can be clamped in a multi-axis stage, for example a 5-axis translation stage (e.g., x, y, z, pitch and yaw). The clamp holding the CFA can clamp on the CFA or on the fiber cable. A flexible cantilevered spring can be mounted on the clamp to apply a small amount of pressure to the top of the CFA. This spring preferably only contacts the CFA in the strain-relief region, with the cantilevered fibers protruding out towards the thermode. The spring can control the roll of the CFA, a further degree of translation. The cantilevered spring also allows for a limited amount of vertical motion and pitch change during bonding without damaging the CFA or the PLC.

The pitch of the fibers can be adjusted (for example, to an approximately 2° pitch) so that the tips of the fibers are oriented down (closer to the v-grooves). The fibers can be positioned over the PLC v-grooves and adjusted parallel and centered on the v-grooves. The ends of the fibers can then be positioned over the transverse channel (such as channel 50, shown in FIG. 6) at the end of the waveguide/v-groove interface. Once parallel and centered, the fibers are lowered into the v-grooves until the cover/PLC gap is a minimum and parallel. To allow for thermal expansion, the waveguide/fiber gap can be set to an appropriate amount (e.g., approximately 5 microns) by moving the fibers closer to the PLC waveguides, preferably without touching the fiber terminal ends to the waveguide core.

The bond head can be centered and then lowered onto the CFA cover pressing the fibers into the v-grooves of the PLC device. Index matching adhesive can be applied to the fiber/waveguide interface, which then flows down the fiber/v-groove voids, filling the cover's snap-gap and the CFA/PLC gap. Suitable adhesives are described in commonly-owned, co-pending U.S. patent application Ser. No. 11/423,191, incorporated by reference herein in its entirety. Thus, the cantilevered optical fibers of the CFA are encapsulated and protected by the CFA cover, PLC substrate and the adhesive (s) used. In a preferred aspect, as the cover can be manufactured from a fused silica or quartz material, UV light can be applied through the cover to initiate curing of a UV curing adhesive, followed by heat to finalize the cure. On completion of the cure cycle, the heat is removed and the assembly is allowed to cool under-pressure. Alternatively, as described below, a clamping method can be utilized to couple the CFA and PLC.

In the above bonding example, the CFAs are attached one-at-a-time. With relatively simple modifications to the bonder, CFAs can be attached to both ends of the PLC as a single bond cycle. For double-ended bonding, an accommodation of the thermal expansion growth of the PLC during the thermode cure portion of the cycle can be taken into account.

As described above, the optical adhesive used to bond the CFA to the PLC can be applied after the fibers are fully seated in the v-grooves and positioned relative to the waveguide end-face. This procedure can prevent the need to squeeze the adhesive out of the way of the fiber, as adhesive lodged between the fibers and the v-groove walls can cause a positional offset, adversely affecting optical coupling.

A CFA-PLC device, such as described above, may be used in a wide array of applications including passive optical splitters, wavelength multiplexers, optical switches, polarization controllers, integrated optical lasers and amplifiers, and optical sensors.

Figure 8:
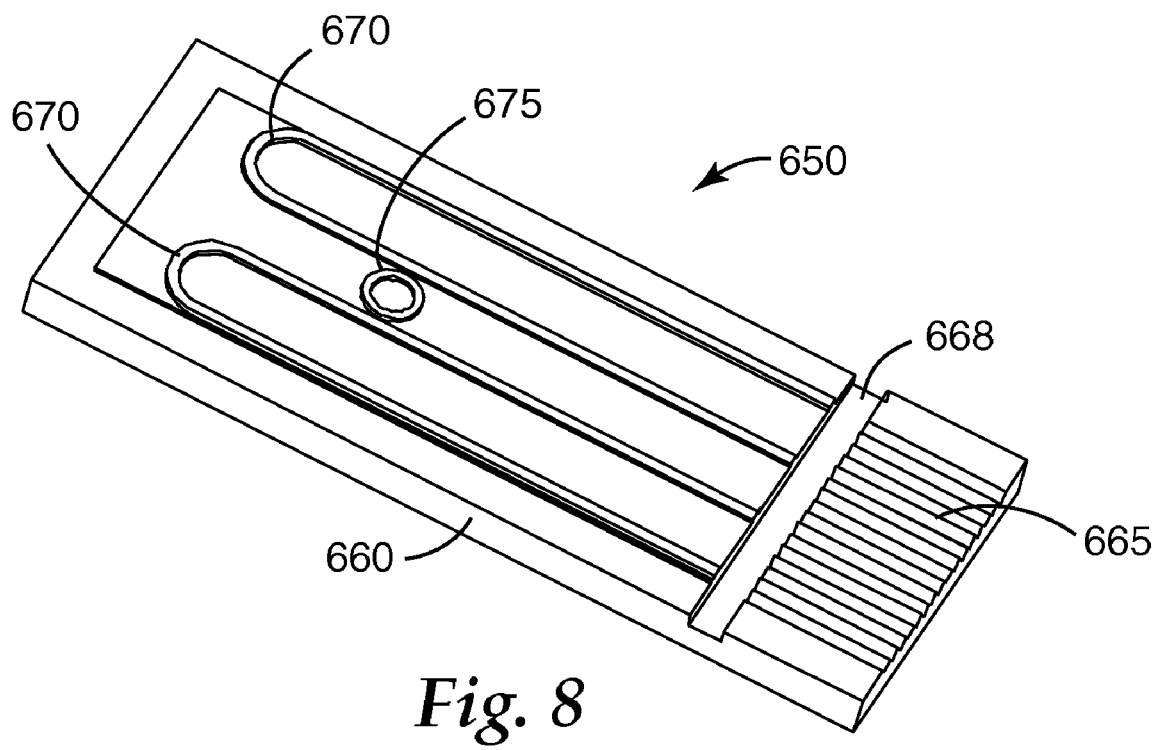
FIG. 8 shows an isometric view of a PLC device configured as a sensor.

For example, FIG. 8 shows an exemplary PLC that is designed as an optical sensor chip 650. The sensor chip 650 can include a waveguide substrate 660 that supports one of more waveguides 670, which can be optically coupled to the output ends of the cantilevered fibers of the CFA. Waveguide substrate 660 further includes a plurality of alignment features, such as fiber guides or channels 665, such as v-grooves, to receive and align the cantilevered fibers from the CFA. A transverse channel 668, such as formed by a saw cut or similar operation at the junction of the waveguides and alignment features can be implemented to remove any residual radius at the junction and to provide a flat surface at the end of the waveguides suitable for mating to the CFA fibers. In addition, a sensor element can be incorporated on sensor chip 650. In this exemplary embodiment, a ring resonator 675 is disposed on chip 650 to optically interact with one or more waveguides 670. For example, sensing can take place as is described in co-pending, commonly owned U.S. patent application Ser. No. 11/277,770, incorporated by reference herein in its entirety.

In some applications, permanent bonding of the CFA to the PLC may not be desired. For example, many telecommunications components must be housed in protective enclosures that shield them from mechanical or environmental damage. These components typically have permanent fiber cable lengths, or "pigtails" attached to them, which are spliced to other fibers to complete the optical circuit. This results in excess fiber cable lengths, which are coiled and stored in the enclosure, often creating the need for additional space for excess fiber length storage. It is therefore desirable to have PLC components with optical connector interfaces integrated in the PLC package, rather than pigtails. As is apparent from the description herein, if the PLC package is provided with a retention mechanism to hold the CFA fibers in registration with the PLC alignment grooves, a connectorized interface suitable for multiple connection-disconnection cycles can be achieved. A schematic drawing of an exemplary connector interface is shown with respect to FIGS. 9-11E.

Figure 9:
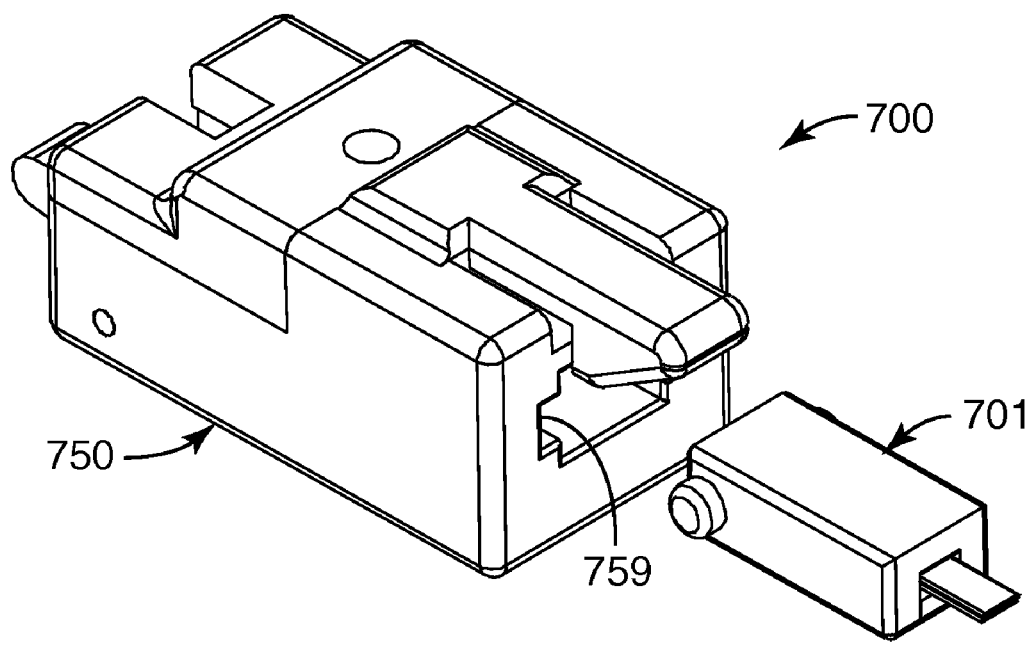
FIG. 9 shows an isometric view of an alternative CFA-PLC device.

As shown in FIG. 9, the CFA-PLC device can be configured as a plug and socket connection system. In particular, device 700 can include a CFA plug element 701 that is configured to be received by PLC socket or receptacle element 750 as a releasable connection.

Figure 10A:
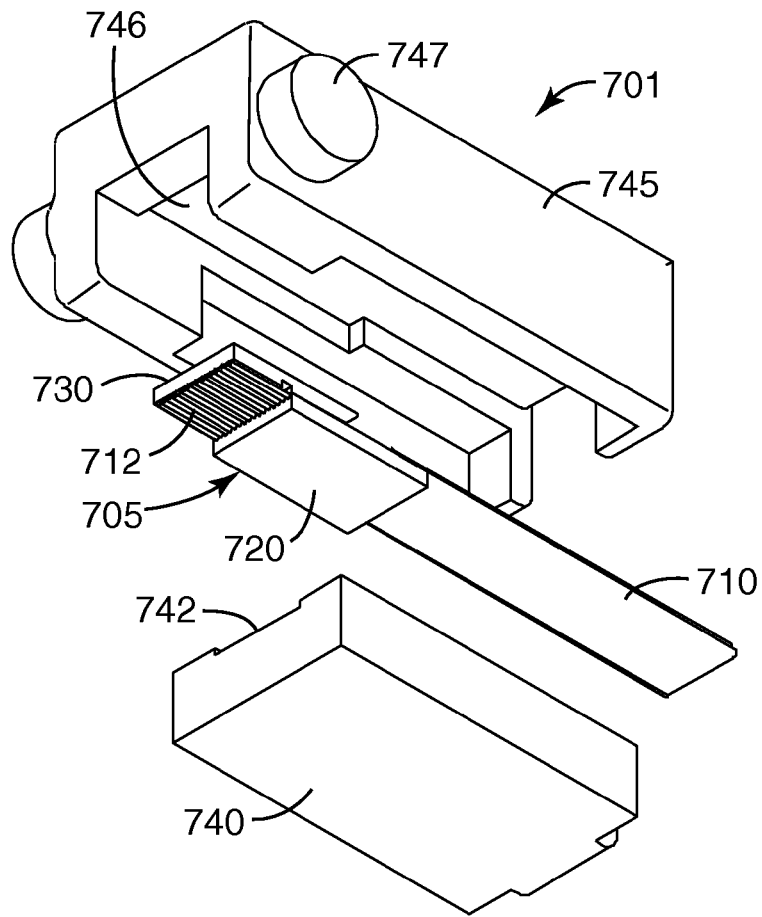
FIGS. 10A and 10B show an isometric and an exploded view of an alternative CFA plug-type element.
Figure 10B:
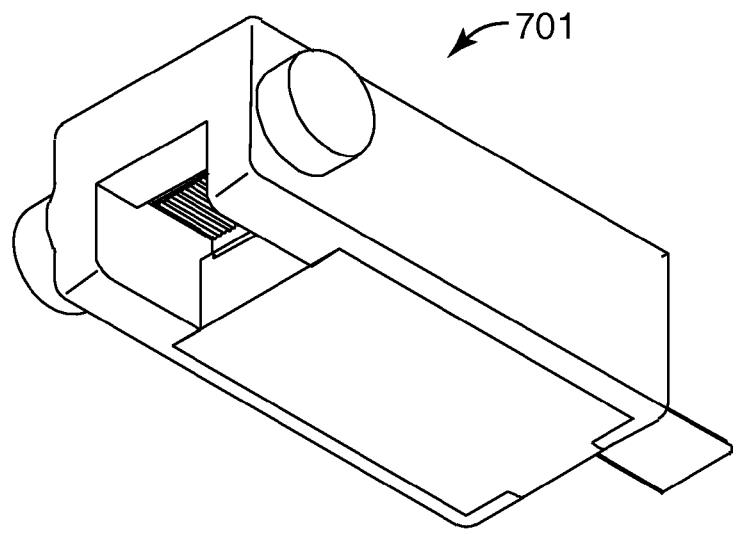

In particular, as is shown in greater detail in FIGS. 10A and 10B, CFA plug element 701 includes a CFA 705, which can be configured and manufactured in a manner similar to that described above. In this exemplary embodiment, CFA 705 can be configured in a manner such as CFA 501 shown in FIG. 5A, and described above. In this exemplary embodiment, CFA 705 can include a plurality of prepared fiber ends 712 from a fiber ribbon cable 710. The fibers can be mounted to a CFA base substrate 720. A cover 730 can protect the cantilevered fibers.

CFA plug element 701 can include a cover portion 745 and a base portion 740. The base and cover portions can be injection molded and shaped to be received by PLC socket element 750. Further, cover portion 745 can further include guide pins or protrusions 747 that can engage with receiving/guiding channels 759 formed in PLC socket 750. CFA 705, in particular cover 730, which can be used as a reference surface, can be bonded onto a surface 746 of cover portion 745. Optionally, the fiber ribbon cable 710 can also be bonded to a surface of cover portion 745. The base portion 740 provides a support surface 742 for CFA base substrate 720 and can be bonded to cover portion 745 to complete the plug portion.

The CFA plug 701 can be releasably connected to a PLC socket or receptacle structure 750 as shown in the connection sequence of FIGS. 11A-11E. In this embodiment, the CFA is not required to be bonded to the PLC in order to achieve suitable coupling.

Figure 11A:
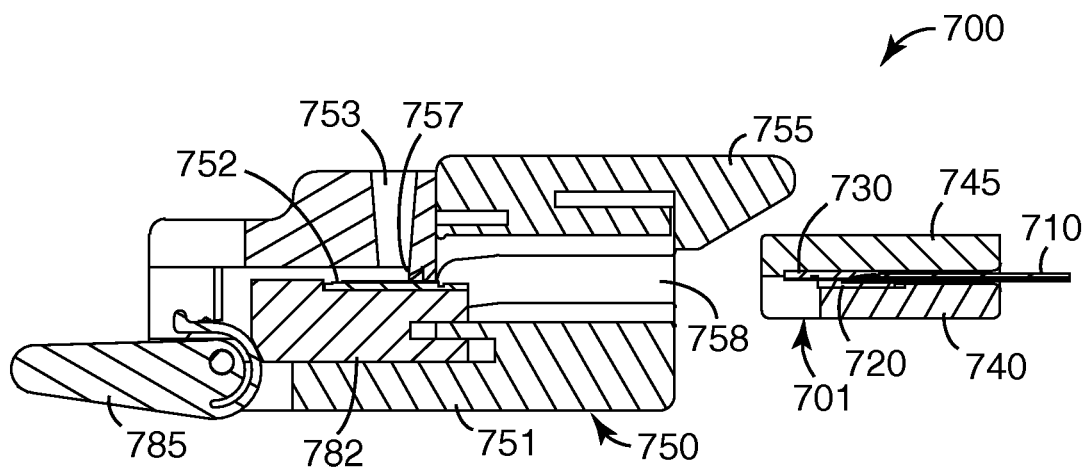
FIGS. 11A-11E show views of a connection sequence of the CFA-PLC device of FIG. 9.

FIG. 11A shows a side view of device 700, which includes CFA plug 701 and PLC socket or receptacle 750. PLC socket 750 includes a socket body 751 formed from an injection molded material. The PLC socket 750 further includes a waveguide die carrier 782 which supports the PLC waveguide die 752 mounted thereon, such as PLC 650 described above, and is moveable within PLC socket 750. In this example, a PLC socket retainer portion 757 can provide a spring/compression force onto PLC waveguide die 752 to keep it in place on moveable die carrier 782. PLC socket 750 further includes a latch 785, used to complete the connection process. In FIGS. 11A-11D, latch 785 is shown in its insert position. PLC socket 750 further includes a locking mechanism or retainer portion 755 that retains the CFA plug 701 in opening 758. PLC socket 750 also includes an opening 753 which allows the user access to a surface of the PLC for testing and analysis. In this regard, if fluids are placed on PLC waveguide die 752 for testing, the PLC socket retainer portion 757 can be configured to prevent flow of the fluid towards the CFA fibers to which the PLC is connected.

Figure 11B:
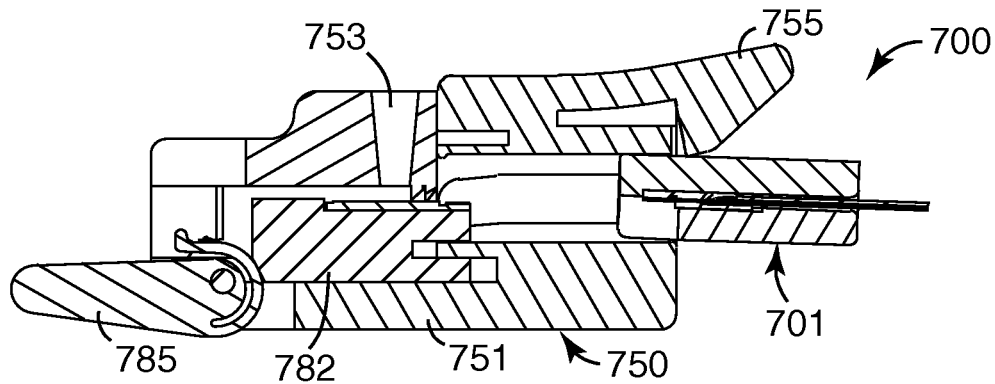
Figure 11C:
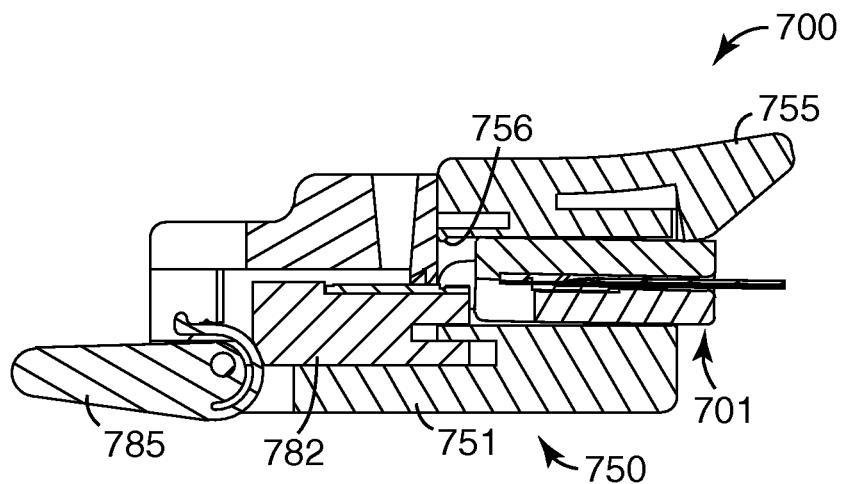
Figure 11D:
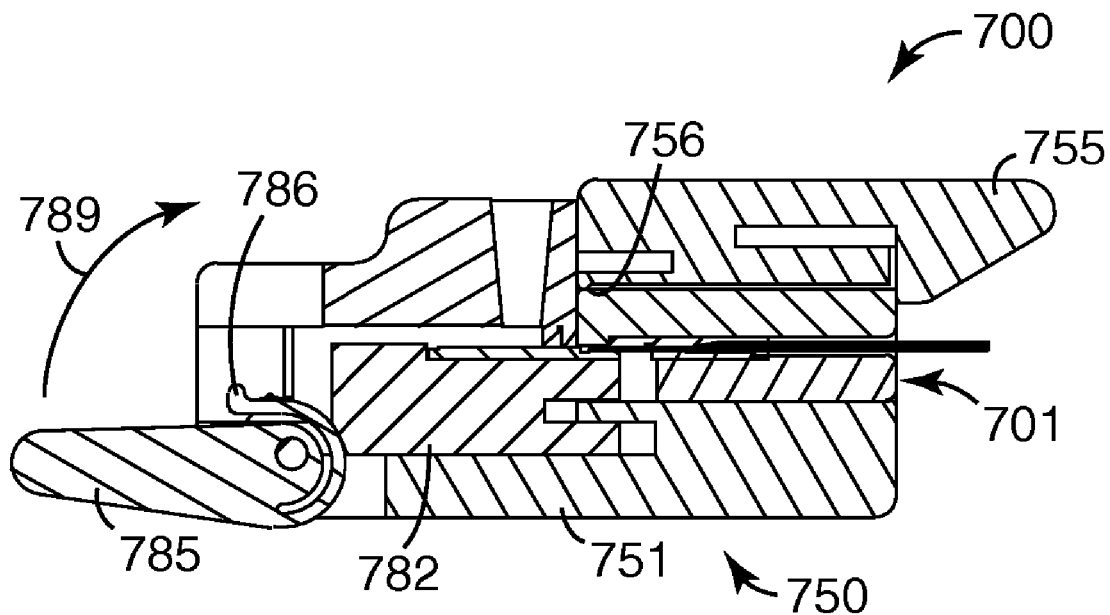

As shown in FIG. 11B, the CFA plug 701 can be inserted in PLC socket 750 through opening 758. The retainer portion 755 can be flexed out of the path of CFA plug 701. FIG. 11C shows the CFA plug 701 inserted about 75% of the way in the PLC socket. As shown in FIG. 11D, the CFA plug 701 is about 100% inserted into PLC socket 750. The CFA retainer portion 755 flexes back to its normal state and prevents CFA plug 701 from sliding out of the socket 750. In addition, a portion of the PLC socket body, shown in FIG. 11D as portion 756 applies a downward force to the CFA cover portion 745, forcing the cantilevered fibers into the receiving grooves of the PLC substrate. The receiving grooves can optionally include an index matching fluid.

Figure 11E:
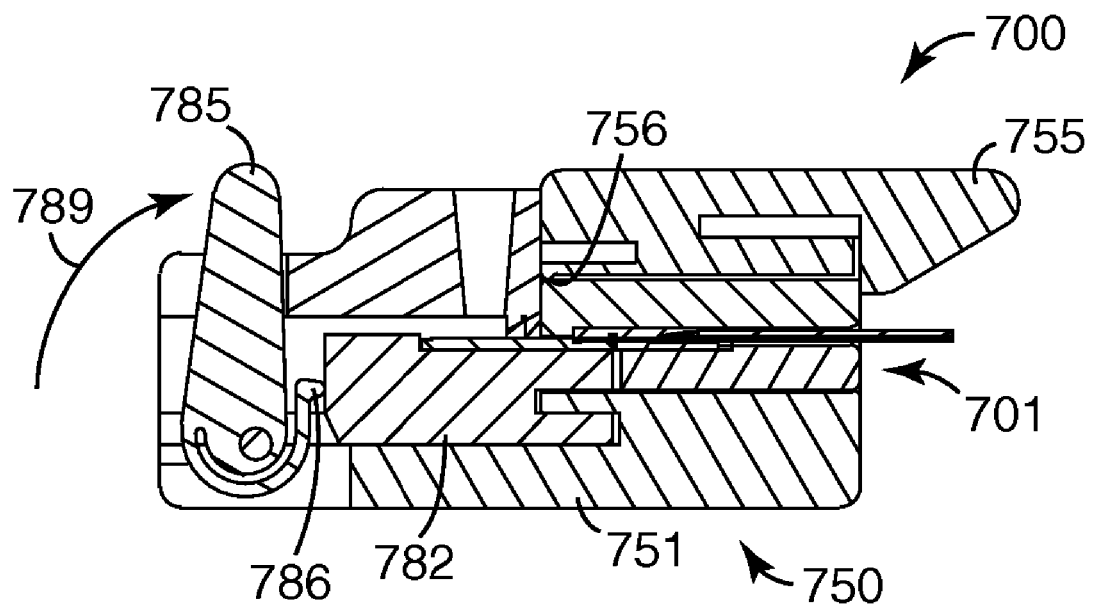

In an exemplary embodiment, the waveguides are brought into more optimal optical coupling with the fibers of the CFA by further moving the PLC die towards the locked in fibers of the CFA. As shown in FIG. 11E, latch 785 can be rotated in the direction of arrow 789. As latch 785 moves, a portion of die carrier 782 is engaged by projection 786 which pushes die carrier 782 towards the terminal ends of the CFA fibers. The latch 785 can be temporarily locked in place after rotation by a locking mechanism, such as a detent (not shown). Thus, a mechanical system, as opposed to a bonding material, can complete the connection of the CFA fibers to the waveguides of the PLC. In addition, the CFA plug portion can be removed from PLC socket 750 by releasing the retainer portion 755 and sliding the plug 701 out of the PLC opening 758.

As described above, the PLC can be configured as part of a sensing device that performs optical sensing. The sensor may be a one-use device for performing a medical test on bodily fluids. In this exemplary embodiment, the sensor chip can be designed to be discarded after one use. In the above example, the PLC die 752 is retained by compression forces, as opposed to permanent bonding. Thus, the CFA can be incorporated into the readout system as a temporary optical interface between the disposable PLC chip and the more expensive optical components (e.g. laser source, spectrometer, power meter, etc) comprising the readout system.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electrical, chemical and optical arts will readily appreciate that the present invention may be implemented in a very wide variety of embodiments. This application is intended to cover any adaptations or variations of the preferred embodiments discussed herein.

We claim:

1. An optical device, comprising:
a cantilevered fiber array coupled to a planar lightwave circuit, wherein the cantilevered fiber array comprises a base supporting at least a portion of at least one optical fiber in a fiber guiding channel and a cover having a flat inner surface that extends beyond an end of the base, the cover being bonded to at least one of the base and the at least one optical fiber, wherein a terminal end of the at least one optical fiber extends beyond the end of the base; and
wherein the planar lightwave circuit comprises a planar waveguide formed on a substrate, the planar waveguide including a waveguide core, wherein the terminal end of the fiber of the cantilevered fiber array is disposed in an alignment groove formed in a portion of the planar lightwave circuit substrate.

2. The optical device of claim 1, wherein the planar lightwave circuit comprises a transverse channel formed in the planar lightwave circuit substrate at an optical interface of the waveguide core and the terminal end of the at least one optical fiber.

3. The optical device of claim 1, wherein the cantilevered fiber array includes a plurality of fibers, spaced apart substantially in parallel, disposed in a plurality of fiber guiding channels, wherein the planar lightwave circuit comprises a waveguide having a plurality of waveguide cores and a plurality of grooves formed in the planar lightwave circuit substrate.

4. The optical device of claim 1, wherein a stripped portion of the at least one optical fiber is disposed in the fiber guiding channel.

5. The optical device of claim 1, further comprising an ultraviolet curable index matching adhesive to bond the cantilevered fibers to the planar lightwave circuit.

6. The optical device of claim 1, wherein the endface of the cover is proximate to the endface of the fiber.

7. The optical device of claim 1, wherein the planar lightwave circuit includes a transverse channel formed in the substrate of the planar lightwave circuit between an end of the alignment groove and a first face of the waveguide core.

8. The optical device of claim 3, wherein the cantilevered fiber array is part of a removable connector assembly engageable with a receptacle part of the planar lightwave circuit, wherein the fibers of the cantilevered fiber array are insertable in the plurality of grooves formed in the planar lightwave circuit substrate to provide optical coupling between the fibers and waveguides.

9. The optical device of claim 3, wherein the cantilevered fiber array is part of a readout system that interrogates the planar lightwave circuit device configured as a sensor, wherein the cantilevered fiber array is registered with the plurality of grooves formed in the planar lightwave circuit substrate and the waveguides of the planar lightwave circuit so that the readout system couples optical signals in and out of the planar lightwave circuit sensor.

10. A method of coupling a fiber alignment device to an optical waveguide device comprises:
   providing a fiber alignment device having an extended cover protecting a vertically and horizontally floating cantilevered terminal portion of at least one optical fiber;
   aligning a bare terminal portion of the at least one optical fiber with an alignment feature formed in the surface of the optical waveguide device; and
   coupling the fiber alignment device to the optical waveguide device.

11. The method of claim 10, wherein the optical waveguide device includes a planar waveguide formed on a substrate, the planar waveguide including a waveguide core, and a transverse channel formed in the substrate of the optical waveguide device between an end of the alignment feature and a first face of the waveguide core, wherein the method further includes disposing the at least one fiber in the alignment feature, wherein the terminal end of the at least one optical fiber is disposed proximate to the transverse channel formed in the substrate of the optical waveguide device.

12. The method of claim 10, wherein coupling the fiber alignment device to the optical waveguide device comprises bonding the fiber alignment device to the optical waveguide device, wherein the bonding step includes an ultraviolet curable index matching adhesive being dispensed and cured to bond the cantilevered fibers to the optical waveguide device.

13. The method of claim 11, wherein the fiber alignment device is part of a removable connector assembly that is mateable with a receptacle part of the optical waveguide device, the method farther comprising mating the removable connector assembly with the receptacle part and inserting the at least one fiber of the cantilevered fiber array in the alignment feature formed in the surface of the optical waveguide device, wherein the alignment feature comprises one or more v-grooves integrated on the optical waveguide device to provide optical coupling between the at least one fiber and the planar waveguide.

14. The method of claim 11, wherein the fiber alignment device is part of a readout system that is used to interrogate the optical waveguide device configured as a sensor, wherein the method further comprises registering the fiber alignment device with the alignment feature and planar waveguide so that the readout system couples optical signals in and out of the optical waveguide device sensor.

* * * * *

UNITED STATES PATENT AND TRADEMARK OFFICE
CERTIFICATE OF CORRECTION

PATENT NO. : 7,587,108 B2                                              Page 1 of 1
APPLICATION NO. : 11/424755
DATED : September 8, 2009
INVENTOR(S) : Barry S Carpenter It is certified that error appears in the above-identified patent and that said Letters Patent is hereby corrected as shown below:

Title Page, Item (56)
Column 2; Other Publications; Line 1, delete "Understanding" and insert -- Understand --, therefor.

Title Page, Item (56) Page 2
Column 2; Other Publications; Line 1, delete "Understanding" and insert -- Understand --, therefor.

Column 3
Line 44; After "thereof" insert -- . --.

Column 4
Line 59; delete "11/423,191," and insert -- 11/423,191 (Atty. Docket No. 61993US002), --, therefor.

Column 15
Line 66; delete "11/423,191," and insert -- 11/423,191 (Atty. Docket No. 61993US002), --, therefor.

Column 19
Line 7; Claim 6, delete "endface" and insert -- end face --, therefor.
Line 8; Claim 6, delete "endface" and insert -- end face --, therefor.

Column 20
Line 21; Claim 13, delete "farther" and insert -- further --, therefor.

Signed and Sealed this

Twenty-fifth Day of May, 2010

David J. Kappos
*Director of the United States Patent and Trademark Office*